US012628252B2

(12) United States Patent
Wang et al.

(10) Patent No.: US 12,628,252 B2
(45) Date of Patent: May 12, 2026

(54) SWITCHING POWER SUPPLY WITH CONSTANT CURRENT OUTPUT AND A METHOD FOR CONTROLLING CONSTANT CURRENT OF A SWITCHING POWER SUPPLY

(71) Applicant: Shenzhen Kiwi Instruments Corporation, Shenzhen (CN)

(72) Inventors: Xiaojia Wang, Shenzhen (CN); Jian Chen, Shenzhen (CN); Xiufeng Yu, Shenzhen (CN)

(73) Assignee: Shenzhen Kiwi Instruments Corporation, Shenzhen (CN)

( * ) Notice: Subject to any disclaimer, the term of this patent is extended or adjusted under 35 U.S.C. 154(b) by 123 days.

(21) Appl. No.: 18/588,243

(22) Filed: Feb. 27, 2024

(65) Prior Publication Data

US 2024/0206036 A1 Jun. 20, 2024

(30) Foreign Application Priority Data

Feb. 27, 2023 (CN) ......................... 202310227843.4

(51) Int. Cl.
*H05B 45/3725* (2020.01)
*H05B 45/345* (2020.01)

(52) U.S. Cl.
CPC ....... *H05B 45/3725* (2020.01); *H05B 45/345* (2020.01)

(58) Field of Classification Search
CPC .. H05B 45/3725; H05B 45/345; H05B 45/34; H05B 47/16; Y02B 70/10
See application file for complete search history.

(56) References Cited

U.S. PATENT DOCUMENTS

2004/0095264 A1* 5/2004 Thomas .............. H02M 3/1582 341/53
2013/0107585 A1* 5/2013 Sims ................. H02M 3/33507 363/21.14

(Continued)

FOREIGN PATENT DOCUMENTS

CN 102055344 A 5/2011
CN 203135737 U 8/2013
CN 105655985 A * 6/2016 ........... H02H 1/0007

*Primary Examiner* — Abdullah A Riyami
*Assistant Examiner* — Syed M Kaiser
(74) *Attorney, Agent, or Firm* — NZ Carr Law Office

(57) ABSTRACT

The application discloses a switching power supply with constant current output and a method for controlling constant current of a switching power supply, wherein the switching power supply comprises a detection circuit and a logic control chip, and the detection circuit is configured to output a feedback voltage. The feedback voltage is a sum voltage of a first voltage and a second voltage, and the second voltage represents output current of the switching power supply. The logic control chip is configured to receive the feedback voltage and compare the feedback voltage with a reference voltage. When the output current changes, the logic control chip changes turn on time of the switching power supply based on comparison result to control the output current constant. The reference voltage set by a switching power supply with constant voltage output is very high, while operating current requirement of constant current drive is very small, and the reference voltage is too high relative to the second voltage, so the first voltage is introduced to bear part of the reference voltage, so that constant current reference is lowered, so as to take into account needs of constant current drive and power consumption.

9 Claims, 2 Drawing Sheets

(56) References Cited

U.S. PATENT DOCUMENTS

| | | | | |
|---|---|---|---|---|
| 2019/0346088 | A1* | 11/2019 | Xiong | F21V 29/70 |
| 2022/0141930 | A1* | 5/2022 | Ye | H05B 47/25 |
| | | | | 315/307 |
| 2023/0067735 | A1* | 3/2023 | Chen | H02M 1/4225 |

* cited by examiner

SWITCHING POWER SUPPLY WITH CONSTANT CURRENT OUTPUT AND A METHOD FOR CONTROLLING CONSTANT CURRENT OF A SWITCHING POWER SUPPLY

CROSS-REFERENCE TO RELATED APPLICATIONS

This application claims priority to and the benefit of Chinese Patent Applications No. 202310227843.4, filed on Feb. 27, 2023, which are incorporated herein by reference in its entirety.

TECHNICAL FIELD

This application relates to the power electronics technical field, in particular but not limited to a switching power supply with constant current output and a method for controlling constant current of a switching power supply.

BACKGROUND

Light emitting diodes, referred to as LEDs, emit light by combining electrons with holes to release energy, widely applied in field of lighting. When LEDs are applied as displays or lighting devices, in order to obtain expected brightness requirement, ensure consistency of each LED brightness and chroma, need to be driven by constant current.

Displays or lighting devices are usually driven by a switching power supply, however, existing switching power supplies generally use constant voltage output, which does not match needs of LED constant current drive.

In view of this, it is necessary to provide a new structure or control method for solving at least some of the above problems.

SUMMARY

In view of one or more problems in the prior art, a switching power supply with constant current output and a method for controlling constant current of a switching power supply is provided in the present application.

An embodiment of the present application discloses a switching power supply with constant current output, applied to light emitting diodes, the switching power supply comprising:

- a detection circuit, configured to generate a first voltage and a second voltage, wherein the first voltage is greater than the second voltage, and the second voltage represents output current of the switching power supply; and
- a logic control chip, configured to receive a feedback voltage and compare the feedback voltage with a reference voltage, when the output current of the switching power supply changes, the logic control chip changes turn on time of the switching power supply based on comparison result to control the output current constant; wherein the feedback voltage is a sum voltage of the first voltage and the second voltage.

Another embodiment of the present application discloses a switching power supply with constant current output, the switching power supply comprising:

- a detection circuit, configured to generate a first voltage and a second voltage, wherein the second voltage represents output current of the switching power supply; and
- a logic control chip, configured to receive a feedback voltage and compare the feedback voltage with a reference voltage, when the output current of the switching power supply changes, the logic control chip changes turn on time of the switching power supply based on comparison result to control the output current constant.

Another embodiment of the present application discloses a method for controlling constant current of a switching power supply, applied to light emitting diodes, the method comprising:

- generating a first voltage and a second voltage, wherein the first voltage is greater than the second voltage, and the second voltage represents output current of the switching power supply;
- summing the first voltage and the second voltage to generate the feedback voltage; and
- comparing the feedback voltage with a reference voltage, when the output current of the switching power supply changes, changing turn on time of the switching power supply based on comparison result to control the output current constant.

BRIEF DESCRIPTION OF THE DRAWINGS

The above aspects and implementation forms of the present application will be explained in the following description of specific embodiments in relation to the enclosed drawings, in which.

DETAILED DESCRIPTION

In order to further understand the present application, the following describes the preferred implementation scheme of the application in combination with embodiments, but it should be understood that these descriptions only for further illustrate the features and advantages of the present application, rather than limit the claims of the present application.

The descriptions in this section is only for a few typical embodiments, and the present application is not limited to the scope of the description of the embodiments. Combinations of different embodiments, replacement of some technical features in different embodiments, and replacement of same or similar prior art means with some technical features in the embodiments are also within the scope of description and protection of the present application.

"Coupling" or "connection" in the specification includes both direct connection and indirect connection. Indirect connection is a connection through an intermediate medium, such as a connection through an electrically conductive medium such as a conductor, wherein the electrically conductive medium may contain parasitic inductance or parasitic capacitance, and may also be connected through an intermediate circuit or component described in the embodiments in the specification; indirect connections may also include connections through other active or passive devices on the basis of which the same or similar functions can be achieved, such as connections through switches, signal amplifiers, follower circuits and other circuits or components. “Multiple” or “many” means two or more. In addition, in the present application, terms such as first and second are used primarily to distinguish one technical feature from another and do not necessarily require or imply an actual relationship or sequence between these technical features.

Figure 1:
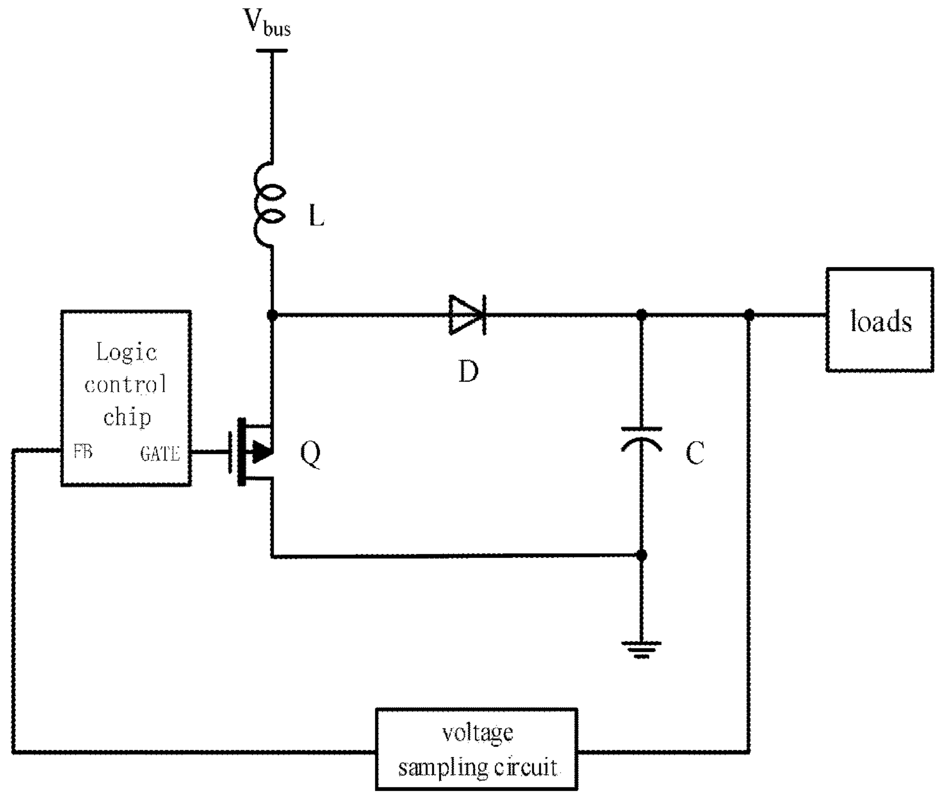
FIG. 1 shows the structure diagram of a switching power supply with constant voltage output.

FIG. 1 shows a switching power supply with constant voltage output, in the figure, the voltage sampling circuit is configured to sample output voltage of the switching power supply, and provide a feedback voltage representing output voltage of the switching power supply to the logic control chip. When the switch tube Q is switched on, the voltage at the lower side of the inductor L rises, so the feedback voltage will also rise. After receiving the feedback voltage, the logic control chip compares it with a internal reference voltage, if the feedback voltage rises to greater than the reference voltage, the logic control chip will control the switch tube Q to turn off. When loads change, the feedback voltage will also change accordingly, the logic control chip will turn off the switch tube Q in advance/delay, and turn on time of the switch tube Q will change correspondingly, thus keeping the output voltage of the switching power supply constant.

The principle of constant voltage output of a switching power supply is described above. Constant voltage output can meet most of scene requirements. However, when loads are light emitting diodes, constant voltage output will make light emitting diodes brightness and chroma inconsistent.

Inspired by the principle of constant voltage output, the applicant replaces the voltage sampling circuit in FIG. 1 with a current sampling circuit, and the current sampling circuit is configured to sample output current of the switching power supply. The logic control chip compares the feedback voltage representing the output current of the switching power supply with the reference voltage, thus controlling the output current to remain constant. However, after replacing the voltage sampling circuit, energy consumption of the switching power supply increases. This is because the logic control chip on market usually sets the reference voltage to 2.5V, and current driving light emitting diodes to operate is usually tens to hundreds of milliamps. Therefore, resistance value of a sampling resistance needs to be set very large, reaching hundreds to thousands of ohms, and some of electrical energy is consumed by the sampling resistance.

Figure 2:
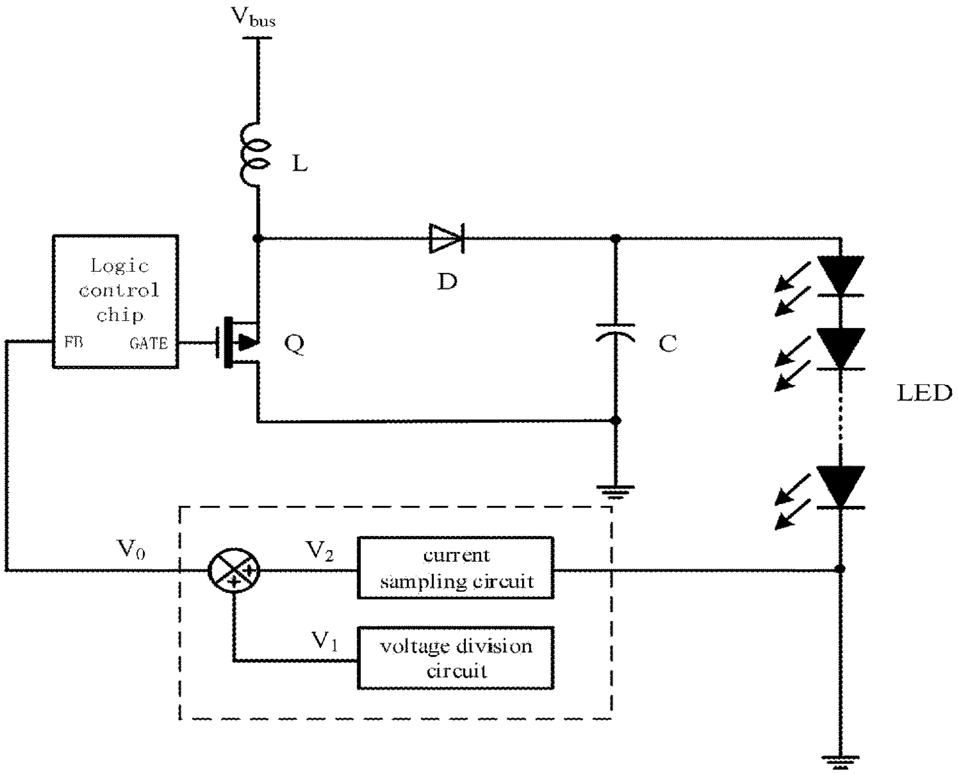
FIG. 2 shows a schematic diagram of a switching power supply with constant current output according to an embodiment of the present application.

To meet both constant current drive and power consumption requirements, referring to FIG. 2, the application provides a switching power supply with constant current output, which comprises a detection circuit and a logic control chip. Wherein, the logic control chip is provided with a feedback pin and a switch tube control pin. Through the feedback pin, the logic control chip receives the feedback voltage representing output current of the switching power supply from the detection circuit, and compares the feedback voltage with a internal reference voltage, if the feedback voltage rises to greater than the reference voltage, the logic control chip turns off the switch tube Q through the switch tube control pin. The detection circuit comprises a current sampling circuit and a voltage division circuit. Wherein the current sampling circuit is configured to sample the output current of the switching power supply, and the voltage division circuit is configured to provide a first voltage V1 which is slightly less than the reference voltage. The first voltage V1 and the second voltage V2 that represents the output current are fed back to the logic control chip, and then the logic control chip compares a sum voltage of the first voltage V1 and the second voltage V2 with the reference voltage, so as to control the output current of the switching power supply to remain constant. In one embodiment, the reference voltage is 2.5V, the first voltage V1 provided by the voltage division circuit is 2.2V, and operating current of light emitting diodes is 0.3 A, thus calculating that resistance value of the sampling resistance is set to 1Ω. Power consumption of the sampling resistance heating is greatly reduced. At the same time, when loads change, the second voltage V2 will also change accordingly, the logic control chip will turn off the switch tube Q in advance/delay, and turn on time of the switch tube Q will change correspondingly, so as to control the output current of the switching power supply to remain constant.

Figure 3:
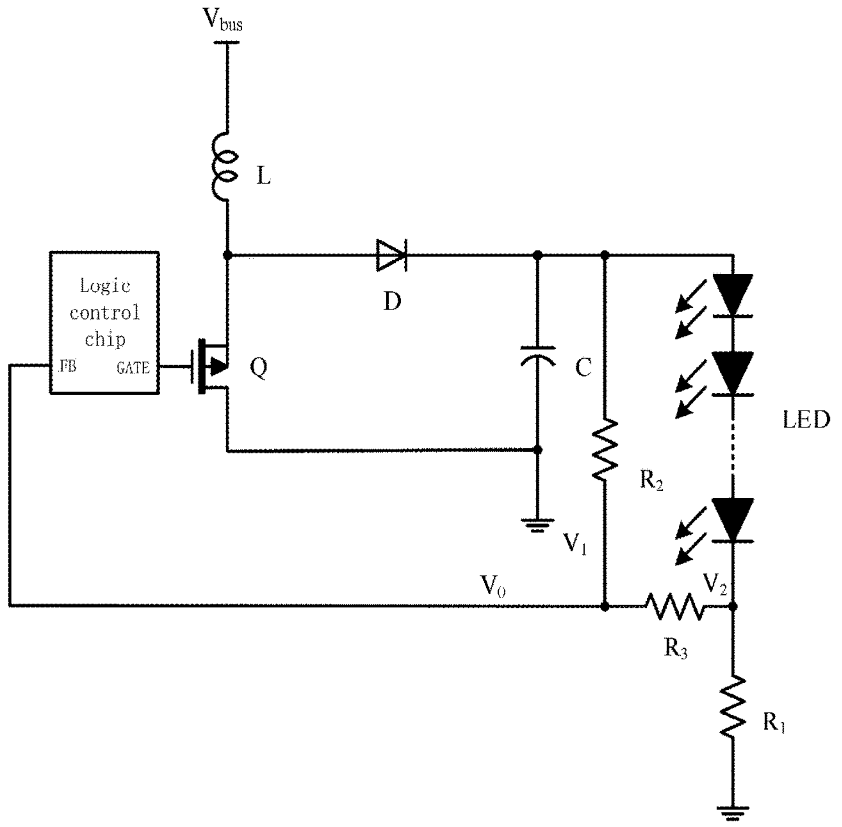
FIG. 3 shows a schematic diagram of the detection circuit structure according to an embodiment of the present application.

In one embodiment, as shown in FIG. 3, the current sampling circuit comprises a first resistor R1, one end of the first resistor R1 is coupled to tail end of the light emitting diodes, and the other end is coupled to ground. The voltage division circuit comprises a second resistor R2 and a third resistor R3. The second resistor R2 is coupled to head end of the light emitting diodes, one end of the third resistor R3 is coupled to the first resistor R1, and the other end of the third resistor R3 is coupled to the second resistor R2. The voltage division circuit provides the first voltage V1 slightly less than the reference voltage by adjusting ratio of the second resistance R2 and the third resistance R3. The current sampling circuit provides the second voltage V2 through the first resistor R1. The first voltage V1 and the second voltage V2 are fed back to the logic control chip. The circuit structure of this embodiment is simple, and the conversion from constant voltage control to constant current control can be completed only by increasing the current sampling resistance (R1), and adjusting ratio and coupling mode of the partial resistance (R2 and R3) on the basis of the switching power supply with constant voltage output.

Figure 4:
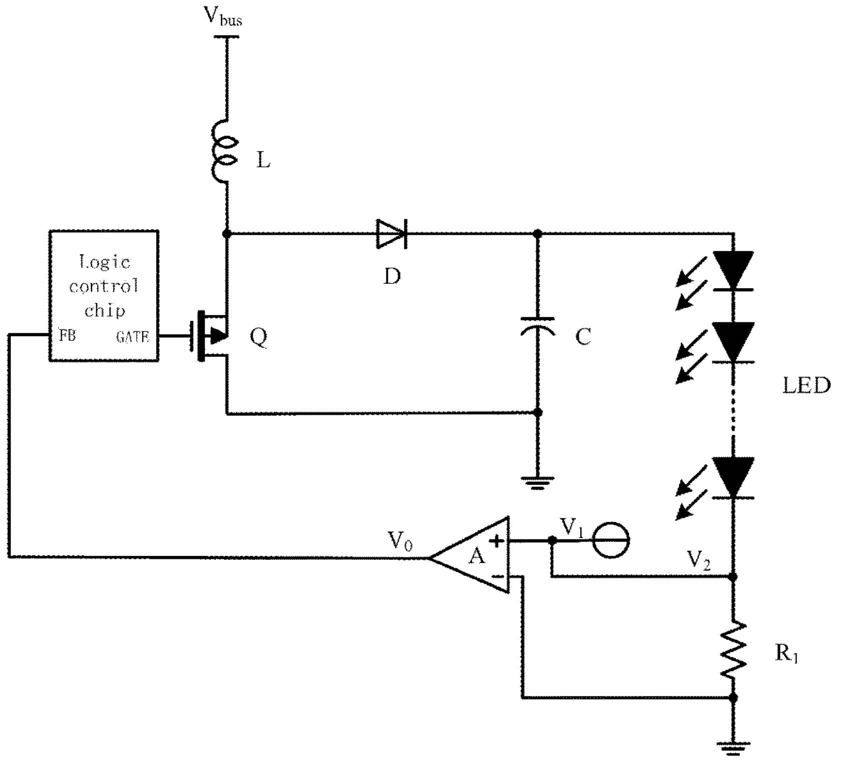
FIG. 4 shows a schematic diagram of the detection circuit structure according to another embodiment of the present application.

In one embodiment, as shown in FIG. 4, the first voltage V1 can also be provided by a constant voltage signal (such as a constant voltage source), the first voltage V1 provided by the constant voltage signal and the second voltage V2 provided by the current sampling circuit are summed by an addition circuit and fed back to the logic control chip. Alternatively, the constant voltage signal is coupled to a not gate, and the first voltage V1 provided by the constant voltage signal (negative after coupling of the not gate) and the second voltage V2 provided by the current sampling circuit are subtracted by a subtraction circuit and fed back to the logic control chip.

The application further provides a method for controlling constant current of a switching power supply, wherein the method comprises:

- generating a first voltage and a second voltage, wherein the first voltage is greater than the second voltage, and the second voltage represents output current of the switching power supply;
- summing the first voltage and the second voltage to generate the feedback voltage; and
- comparing the feedback voltage with a reference voltage, when the output current of the switching power supply changes, changing turn on time of the switching power supply based on comparison result to control the output current constant.

The principle of constant current control in this method can be referred to above description of the switching power supply with constant current output, and this embodiment will not be repeated.

The field technician should know, specification or drawings of the logic control of the "high level" and "low level", "setting" and "reset", "and gate" and "or gate", "non-inverting input" and "inverting input" logic control can exchange each other or change, such as by adjusting the subsequent logic control and the implementation and the implementation of the same function or purpose.

The description and application of the present application herein is illustrative and is not intended to limit the scope of the present application to the above embodiments. The description of effects or advantages involved in the specification may not be reflected in actual experimental cases due to the uncertainty of specific condition parameters or other factors, and the description of effects or advantages shall not be used to limit the scope of the application. Variations and alterations of embodiments disclosed herein are possible and the substitutions and equivalent components of embodiments are known to those ordinary technicians in the field. It should be clear to those skilled in the field that the application may be realized in other forms, structures, arrangements, proportions, and with other components, materials and components, without deviating from the spirit or essential characteristics of the application. Other variations and alterations may be made to the embodiments disclosed herein without leaving the scope and spirit of the application.

The invention claimed is:

1. A switching power supply with constant current output, applied to light emitting diodes, the switching power supply comprising:

a detection circuit, configured to generate a first voltage and a second voltage, wherein the first voltage is greater than the second voltage, and the second voltage represents output current of the switching power supply; and a logic control chip, configured to receive a feedback voltage and compare the feedback voltage with a reference voltage, when the output current of the switching power supply changes, the logic control chip changes turn on time of the switching power supply based on comparison result to control the output current constant; wherein the feedback voltage is a sum voltage of the first voltage and the second voltage;

wherein the detection circuit further comprises an addition circuit, the addition circuit is configured to sum the first voltage and the second voltage to generate the feedback voltage.

2. The switching power supply according to claim 1, wherein the detection circuit comprises a voltage division circuit and a current sampling circuit, the voltage division circuit is configured to generate the first voltage, the current sampling circuit is configured to sample the output current of the switching power supply, and generates the second voltage based on the output current.

3. The switching power supply according to claim 2, wherein the current sampling circuit comprises a first resistance, one end of the first resistance is coupled to tail end of the light emitting diodes, and the other end of the first resistance is coupled to ground.

4. The switching power supply according to claim 2, wherein the voltage division circuit comprises a constant voltage source, the constant voltage source is configured to generate the first voltage.

5. The switching power supply according to claim 3, wherein the voltage division circuit comprises a second resistor and a third resistor, one end of the second resistor is coupled to head end of the light emitting diodes; one end of the third resistance is coupled to the first resistance, and the other end of the third resistance is coupled to the second resistance.

6. A switching power supply with constant current output, the switching power supply comprising:

a detection circuit, configured to generate a first voltage and a second voltage, wherein the second voltage represents output current of the switching power supply; and a logic control chip, configured to receive a feedback voltage and compare the feedback voltage with a reference voltage, when the output current of the switching power supply changes, the logic control chip changes turn on time of the switching power supply based on comparison result to control the output current constant;

wherein the detection circuit further comprises an addition circuit, the addition circuit is configured to sum the first voltage and the second voltage to generate the feedback voltage.

7. The switching power supply according to claim 6, wherein the first voltage is greater than the second voltage.

8. The switching power supply according to claim 6, wherein the switching power supply is applied to light emitting diodes.

9. A method for controlling constant current of a switching power supply, applied to light emitting diodes, the method comprising:

generating a first voltage and a second voltage, wherein the first voltage is greater than the second voltage, and the second voltage represents output current of the switching power supply;

summing the first voltage and the second voltage to generate a feedback voltage; and comparing the feedback voltage with a reference voltage, when the output current of the switching power supply changes, changing turn on time of the switching power supply based on comparison result to control the output current constant.

* * * * *